United States Patent [19]

Maekawa

[11] Patent Number: 4,814,873
[45] Date of Patent: Mar. 21, 1989

[54] METHOD AND APPARATUS FOR CONVERTING AN IMAGE SIGNAL

[75] Inventor: Hitoshi Maekawa, Owariasahi, Japan

[73] Assignee: Hitachi, Ltd., Tokyo, Japan

[21] Appl. No.: 145,144

[22] Filed: Jan. 19, 1988

[30] Foreign Application Priority Data

Jan. 23, 1987 [JP] Japan .................................. 62-12355

[51] Int. Cl.⁴ ............................................... H04N 7/01
[52] U.S. Cl. ...................................... 358/140; 358/11
[58] Field of Search .................................. 358/140, 11

[56] References Cited

U.S. PATENT DOCUMENTS

| | | | |
|---|---|---|---|
| 4,723,163 | 2/1988 | Skinner | 358/140 |
| 4,729,012 | 3/1988 | Jose | 358/140 |
| 4,730,215 | 3/1988 | Jose | 358/140 |
| 4,733,299 | 3/1988 | Glenn | 358/140 |

FOREIGN PATENT DOCUMENTS 0212784 3/1987 European Pat. Off. .
60-42993 3/1985 Japan .

Primary Examiner—Howard W. Britton
Attorney, Agent, or Firm—Kenyon & Kenyon

[57] ABSTRACT

Method and apparatus for converting a hivision TV image signal to a computer terminal image signal are disclosed. Three line memories are provided for three continuous scan lines in a field. Data of one scan line of a hivision TV image signal is written into one of the three line memories and data previously written into other two are read therefrom. A read sampling clock period is set to be 4/5 of a write sampling clock period, and the outputs of the two line memories are linearly interpolated so that the scan lines appear at the same position in first and second fields.

18 Claims, 7 Drawing Sheets

METHOD AND APPARATUS FOR CONVERTING AN IMAGE SIGNAL

BACKGROUND OF THE INVENTION

The present invention relates to method and apparatus for converting an image signal of a hivision TV to an image signal of a computer terminal, and more particularly to method and apparatus for converting an image signal effective in a superimpose apparatus which combines an image generated by a character terminal or a graphic terminal with an image generated by a standard hivision TV.

Combination of the image of the computer terminal and the image of the standard TV system such as NTSC system has been expected in various fields. Image resolutions of personal computers and work stations has been recently more and more increasing, and a non-interlace system having 700–800 dots horizontally and approximately 520 dots vertically has been becoming common. When the character image or graphic image (called terminal image hereafter) of such a terminal is to be combined with an image of the NTSC system TV, the following problems arise. In the NTSC system, (1) a scan line (dot) density per field is approximately one half of that of the terminal image, (2) signals between two adjacent fields have one-half scan line shift because of interlace scan (scan lines of first and second fields are shifted by one-half scan line interval), and (3) if a video signal is converted to a pixel density of the terminal image, an unnatural border line appears on an animation image (normally received image).

A difference between the dot densities of the NTSC system and the terminal image may be resolved by using a hivision signal which is a future TV signal system. The hivision TV signals has a specification of 1125 scan lines (interlaced scan), 20 MHz video band and 5/3 aspect ratio. The number of scan lines per field and the field frequency are essentially same as those of the terminal image.

In the combination of the hivision signal and the terminal image signal, the amounts of information are balanced as described above but the shift of one-half scan line interval between the adjacent field signals due to the interlaced scan system remains, and a difference between occupation times per dot is created due to the difference between aspect ratios. The difference between the occupation times per dot is due to the fact that the hivision signal and the terminal signal are of the same scan time in spite of the fact that a horizontal scan distance of the hivision signal is 5/4 of that of the terminal signal (assuming that an image height for the hivision signal is equal to that for the terminal signal). If the hivision signal is outputted to a display having and aspect ratio of ¾, the image is vertically expanded. Accordingly, in the prior art as shown in JP-A-60-42993, where a clock time for reading and writing a field memory is changed, it is accomplished by using one field of memory of the hivision TV signal. As a result, a memory capacity is as large as approximately 2M bytes. In the prior art, the shift of information by one-half scan line interval between adjacent scan lines of the interlaced signal, which is one of the problems mentioned above, is not resolved. When the interlace system signal is converted to a non-interlace system signal, signals shifted by one-half scan line interval are displayed on the same scan position and hence the image vibrates (at a high contrast area) or becomes dim.

An example of conversion of the hivision TV to the NTSC system is disclosed in JP-A-59-104866.

SUMMARY OF THE INVENTION

It is an object of the present invention to resolve the problems encountered in the prior art, eliminate the difference between aspect ratios and the shift of information by one-half scan line interval and convert a hivision TV image signal to a computer terminal image signal without losing a high image quality of the hivision TV.

In order to achieve the above object, in accordance with the present invention, three memories for three continuous scan lines in one field are provided, and one line signal of the hivision TV image signal is written into one of the memories (write mode) and two line signals stored in other two memories are read (read mode). A ratio of a write clock to a read clock is set to 5/4 so that the difference between the aspect ratios is resolved. On the other hand, the two line signals read from the memories are interpolated to produce an image signal corresponding to a position of a first field line from the image signal of a second field of a hivision TV image (interlace) to resolve the shift of information by one-half scan line interval.

DESCRIPTION OF THE PREFERRED EMBODIMENTS

Figure 1:
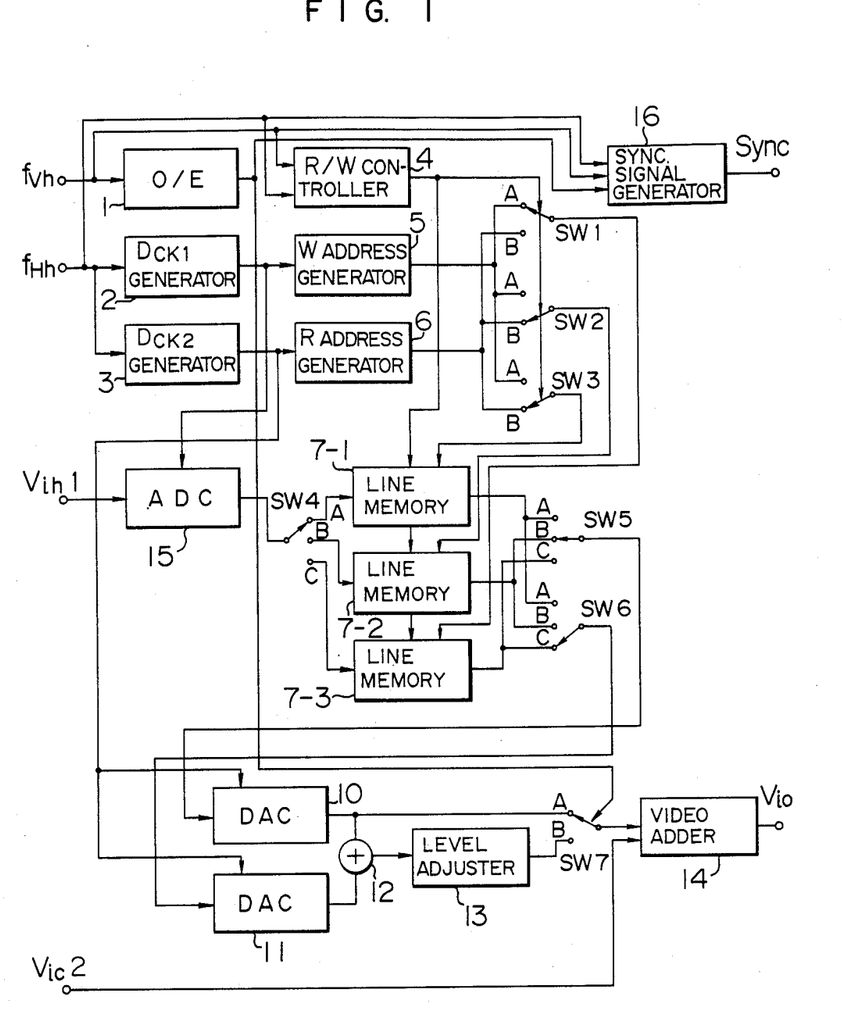
FIG. 1 shows a block-diagram of a main portion of a first embodiment of the present invention.

FIG. 1 shows a block diagram of a configuration of a first embodiment of the present invention. In FIG. 1, $f_{Hh}$ denotes a horizontal synchronization signal of a hivision TV signal, $f_{Vh}$ denotes a vertical sunchronization signal of the hivision TV signal, $V_{ih}$ 1 denotes a video signal of the hivision TV signal, $V_{ic}$ 2 denotes a video signal of a terminal image signal, Sync denotes a signal for synchronizing with a video generator such as personal computer or work station terminal, and $V_{io}$ denotes a combined signal of the above image signals.

An O/E 1 generates a signal for discriminating a first field and a second field of the hivision TV signal. A $D_{ck1}$ generator 2 generates a dot clock $D_{ck1}$ which is an original signal of an address signal for writing into a line memory, based on the hivision horizontal synchronization signal $f_{Hh}$. A $D_{ck2}$ generator 3 generates a dot clock $D_{ck2}$ which is an original signal of an address signal for reading from the line memory, based on the signal $f_{Hh}$. W address generator 5 and R address generator 6 generate a write address and a read address, respectively, of the line memories 7-1, 7-2 and 7-3 in accordance with the dot clocks generated by the $D_{ck1}$ generator 2 and the $D_{ck2}$ generator 3, respectively. An ADC 15 is an AD converter which converts an analog video signal of the hivision TV signal to a digital signal, and DAC 10 and 11 are DA converters which convert digital signals to analog signals. Signals processing for the AD converted bits is common to all bits and hence signal processing for one bit is explained. SW1, SW2 and SW3 select read addresses and write addresses of the line memories 7-1, 7-2 and 7-3 in accordance with a signal from a R/W controller 4. SW4 supplies a signal ADC 15 to the line memory selected to the read mode by the R/W controller 4. SW5 and SW6 supply the outputs of the line memories selected to the write mode by the R/W controller 4 to the DAC 10 and the DAC 11, respectively. An adder 12 adds the signals of the DAC 10 and the DAC 11. A level adjuster 13 attenuates a signal of the adder 12 by 6 dB. SW7 selects an output signal by the signal of the O/E 1. A video adder 14 signal by the signal of the O/E 1. A video adder 14 combines the signal selected by the SW7 with the video signal $V_{ic2}$ of the terminal image signal. A synchronization signal generator 16 generates a signal which synchronizes a video circuit (not shown) of the personal computer which generates the terminal image signal.

Prior to the explanation of the operation of each unit, the one-half line interval shift which causes a problem in converting the hivision TV image signal (interlaced scan) to the terminal image signal (non-interlaced scan) is explained in further detail with reference to FIGS. 2 and 3. In superimposing the hivision TV image signal and the terminal image, the interlaced scan may be used, but flicker may be created in a highly fine display system if the terminal image signal is interlaced-scanned. Accordingly, it is advantageous to use the non-interlaced scan in superimposing those signals.

Figure 2:
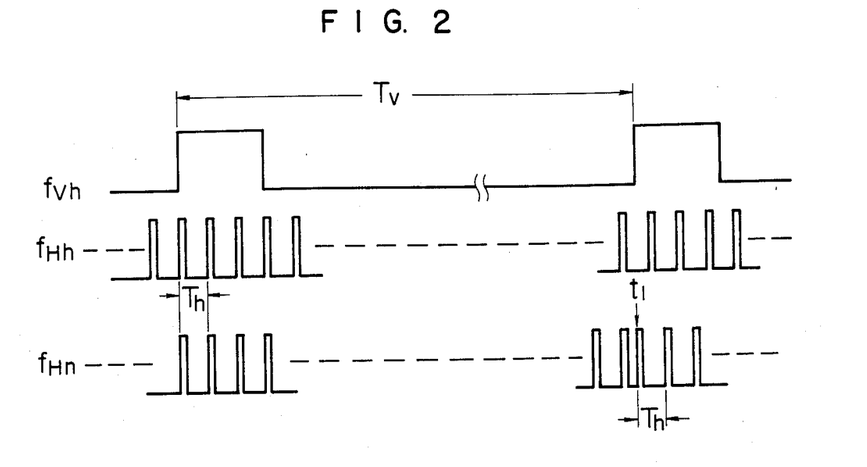
FIG. 2 shows a waveform of a synchronization signal of a hivision signal.

FIG. 2 shows waveforms of horizontal and vertical synchronization signals of the hivision TV signal, in which $f_{Vh}$ denotes the vertical synchronization signal and $f_{Hh}$ denotes the horizontal synchronization signal. In the hivision TV, the synchronization signals have a relation of $T_V = 562.5\, T_h$ (where $T_V$ is a vertical period and $T_h$ is a horizontal period). For the non-interlaced-scan it is necessary that n (number of scan lines) in $T_V = nT_h$ is an integer. It is selected to an integer N (562, 563,...) close to 562.5. A new horizontal period $T_{hn}$ is $T_V/N$. Thus, the horizontal period is different for $T_h$. If the processing for the aspect ratio and one-half line shift is carried out under this condition, the field memory or frame memory as disclosed in JP-A-60-42993 is required. In the present invention, as shown by $f_{Hn}$ in FIG. 2, a horizontal synchronization signal is generated at the next vertical synchronization signal (time $t_1$) without changing the length of $T_h$, and the waveform maintains the period $T_h$ until the next vertical synchronization signal appears.

Figure 3:
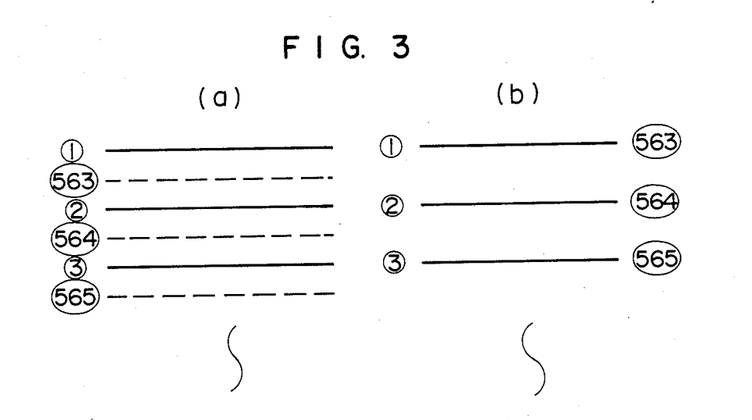
FIG. 3 shows a scan line structure, FIG. 4. shows a block diagram of a dot clock generator.

A raster under this condition is shown in FIG. 3. FIG. 3(a) shows a raster of the hivision TV signal, and FIG. 3(b) shows a raster structure is the above system. A scan line 563 in a second field overlaps with a scan line 1 in a first field. (It may overlap with a scan line 2). The information on the scan line 563 is image information which is shifted by one-half scan line interval from true information. The shifted information are displayed on the same scan position for each field. As a result, a high intensity outline area flicks or becomes dim. Such a problem is resolved in the present invention by a simple construction.

Figure 4:
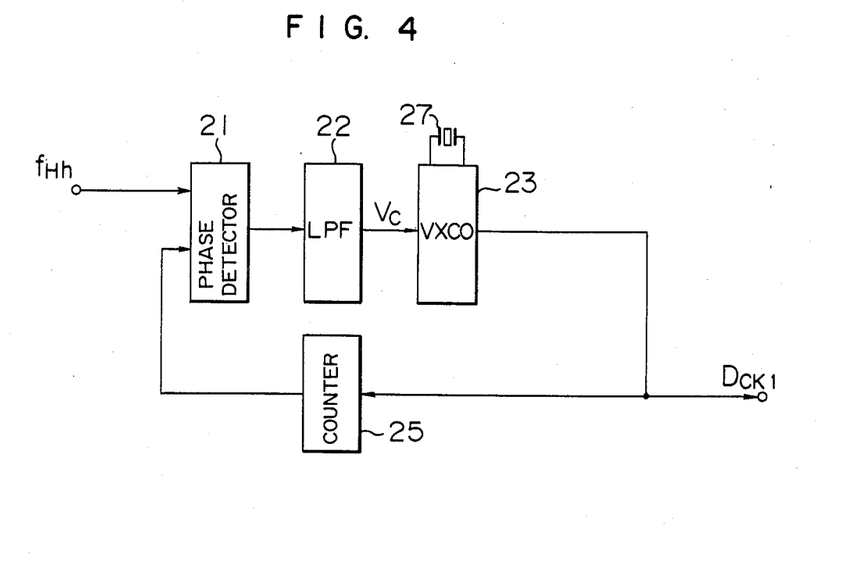

Configuration and operation of the first embodiment are explained in detail. FIG. 4 shows a circuit diagram of the $D_{ck1}$ generator 2. It shows a known crystal oscillation type PLL circuit. A VXCO 23 frequency-divides by a counter 25 an output of a crystal oscillator 27 whose oscillation frequency may be slightly variable by a control input $V_c$, and compares the divided frequency with $f_{Hh}$ by a phase comparator 21. The output of the phase comparator is supplied to a LPF 22 which produces $V_c$ to control the VXCO 23 so that $f_{Hh}$ is divided by the count of the counter to $D_{ck1}$. If the count of the counter is 2048 and one horizontal period has a frequency of 33.75 kHz, the crystal oscillator 27 oscillates at 69.12 MHz. (According to the sampling theory, it is necessary that the video signal band 20 MHz of the hivision TV is no larger than $D_{ck1}$.) The $D_{ck1}$ thus generated is used as a sampling clock of the ADC 15 and an input signal to the write address generator 5, which may be a 2048-bit counter which is reset by the horizontal synchronization signal $f_{Hh}$. Each bit output of the counter is used as write addresses of the line memories 7-1, 7-2 and 7-3. The write address counter may be shared by the counter 25 for $D_{ck1}$. The $D_{ck2}$ generator 3 may be constructed in the same manner as the $D_{ck1}$ generator but the division frequency of the counter and the frequency of the crystal oscillator are different. The division frequency k of the counter is determined by an integer which is close to $2048 \times 4/5$. In the present embodiment, k = 1632 (preferably 8's multiple) and $D_{ck2}$ = 55.08 MHz.

Figure 5:
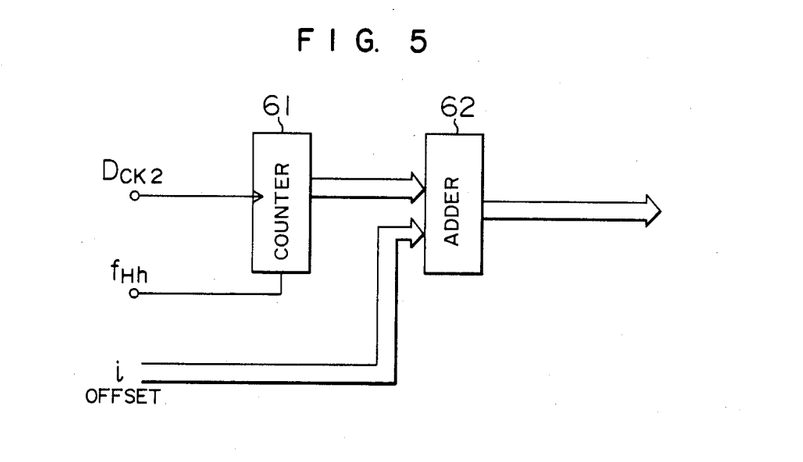
FIG. 5 shows a block diagram of an address generator.

FIG. 5 shows a configuration of the read address generator 6. A counter 61 is reset by the horizontal synchronization signal $f_{Hh}$ and counts up to 1632. (It may be shared by the counter of the $D_{ck2}$ generator). A sum of the output of the counter 61 and an offset digital value i ($i \leq 2048 - 1632$) is the read address. This means that 1632 words starting from any i-th word are selected from one line of hivision signal to adapt the aspect ratio.

Figure 6:
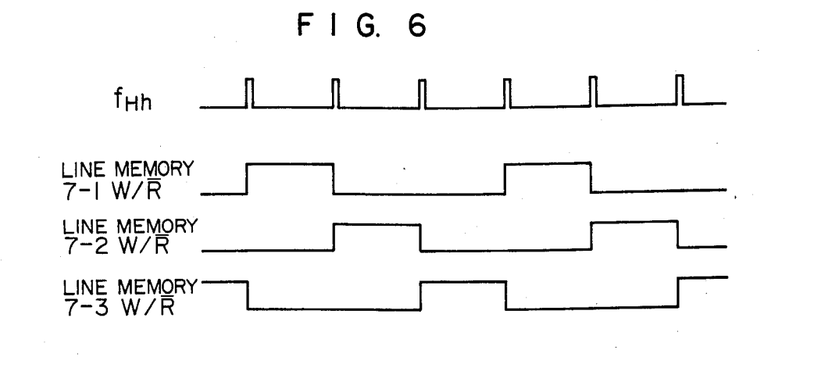
FIG. 6 shows a time chart for illustrating read/write timing of a line memory.
Figure 7:
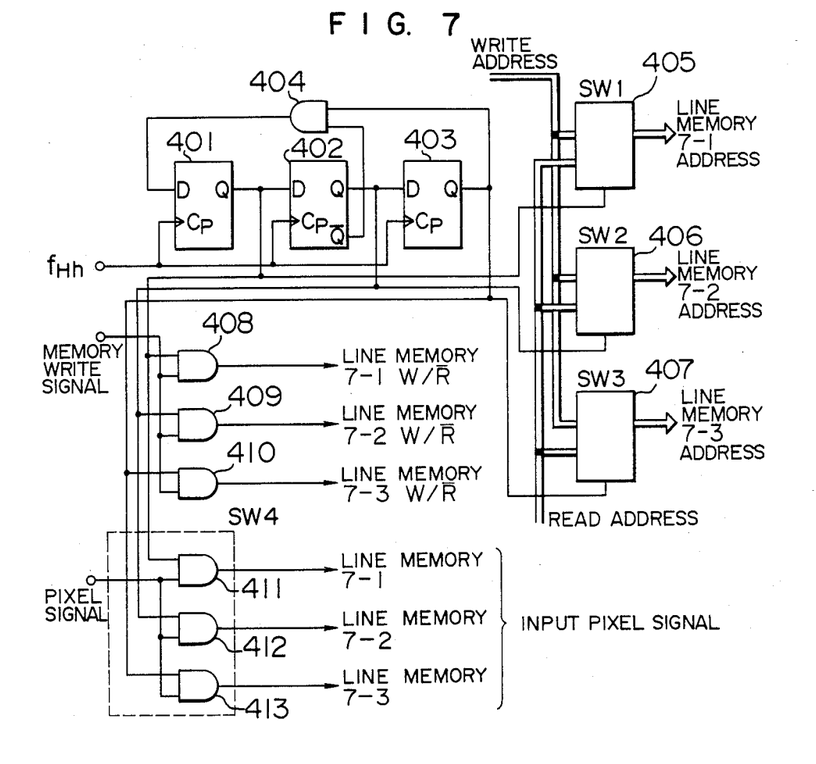
FIG. 7 shows a block diagram of a read/write controller.

The operation of the R/W controller 4 is explained with reference to FIGS. 6 and 7. FIG. 6 is a time chart for showing operation waveforms. FIG. 7 shows a circuit configuration. DFF 401, 402 and 403 and AND 404 of FIG. 7 receive W/R signals of line memories 7-1 to 7-2 shown in FIG. 6. The W/R signals to the line memories are used as switching signals for multiplexers 405, 406 and 407 so that read addresses and write addresses are selectively supplied to the line memories. The W/R signals of the line memories are used to control memory write signals and pixel input signals so that they are supplied to the line memories selected to write mode. Only one line of memory is selected to the write mode at one time.

Figure 8:
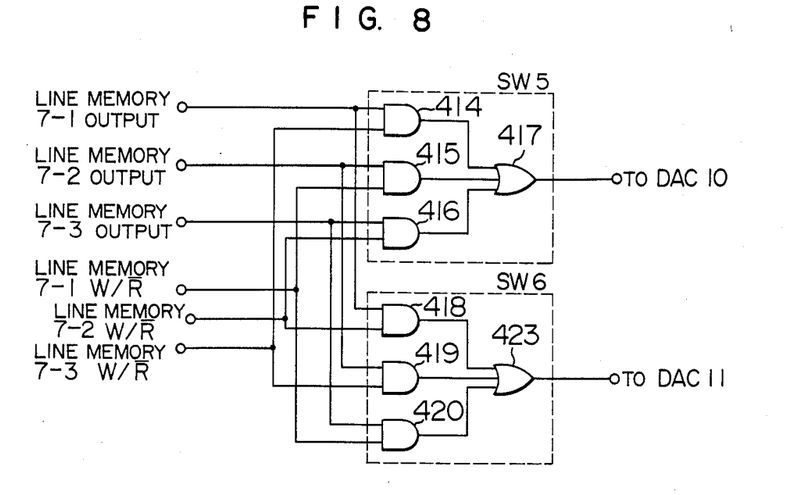
FIG. 8 shows a circuit diagram of SW5 and SW6.

FIG. 8 shows a specific circuit of SW5 and SW6. The SW5 and SW6 selectively supply the outputs of the line memories 7-1 to 7-3 to the DAC 10 and the DAC 11. A relation between the outputs of the line memories supplied to the DAC 10 and the DAC 11 and the line memories in the write mode is shown in Table 1.

TABLE 1

| Line Memory in Write Mode | Line Memory Supplying Output to DAC 10 | Line Memory Supplying Output to DAC 11 |
|---|---|---|
| 7-1 | 7-2 | 7-3 |
| 7-2 | 7-3 | 7-1 |
| 7-3 | 7-1 | 7-2 |

The outputs of the DAC 10 and the DAC 11 are added by the adder 12 and reduced to one half by the level adjuster 13. Thus, the output signal of the level adjuster 13 is a linear interpolation signal of adjacent scan line signals in the field. That is, it is a scan line signal at a mid-point of two adjacent scan lines. This is because of high correlation to the signals between the adjacent scan lines.

Figure 9:
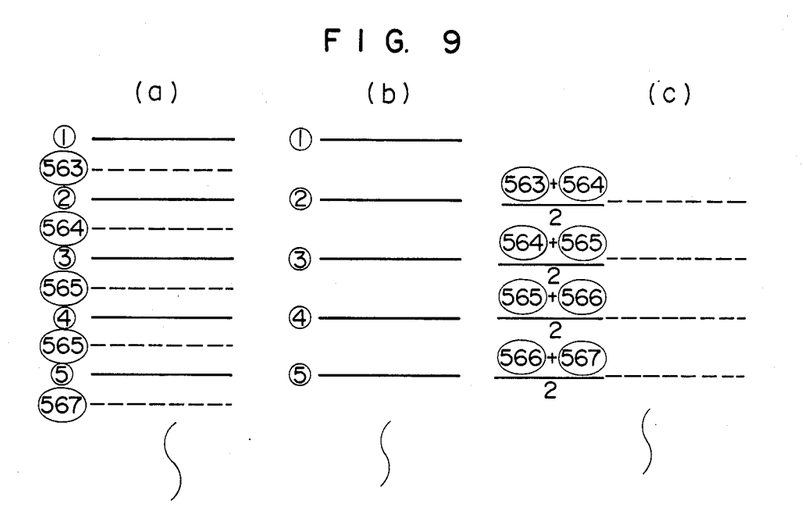
FIG. 9 shows a raster structure for illustrating signal processing in the first embodiment.

FIG. 9 shows raster structures for illustrating signal processing in the present embodiment.

In the first field, the output of the DAC 10 is outputted as it is by the SW7, and in the second field, the output of the level adjuster 13 is selected so that the signals of the scan line positions of the first and second field in the interlaced scan are aligned. SW7 is switched by the signal of the O/E 1.

The hivision TV signal processed as described above and the terminal video signal $V_{ic2}$ are combined by the video adder 14 so that they are superimposed.

Figure 10:
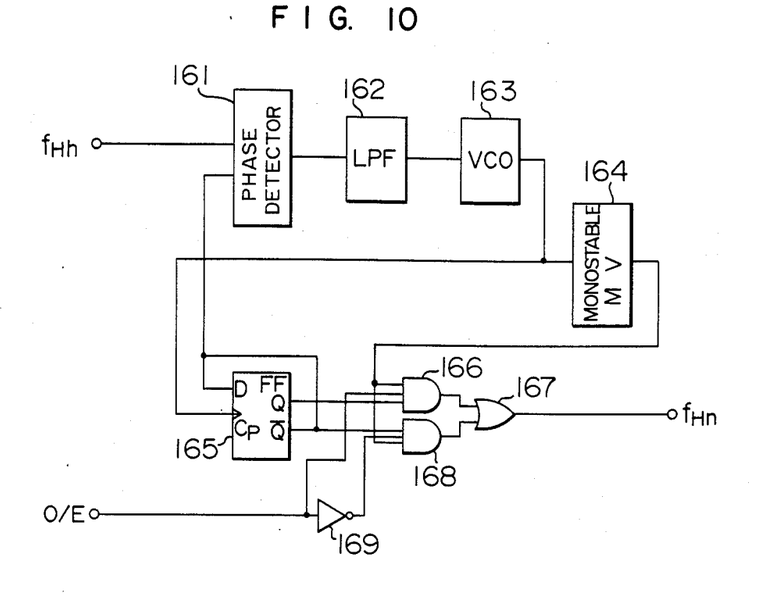
FIG. 10 shows a block diagram of a synchronization signal generator.

The synchronization signal generator 16 produces a non-interlaced synchronization signal $f_{Hn}$ shown in FIG. 2 from the interlaced horizontal synchronization signal. A specific circuit of a main portion thereof is shown in FIG. 10. A phase detector 161, a low-pass filter LPF 162, a VCO 163 and a DEF 165 form a double PLL circuit. A mono-multivibrator 164 determines a pulse width of the horizontal synchronization signal. Outputs of AND circuits 166 and 168 provide synchronization signals having a period $T_h$ shifted by $T_{h/2}$ (where $T_h$ is a horizontal period of the hivision TV signal). They are switched by the signal O/E for each field to produce a new horizontal synchronization signal $f_{Hn}$. The new horizontal synchronization signal and the hivision synchronization signal are used as the synchronization signal Sync to externally synchronize the video circuit such as terminal.

Figure 11:
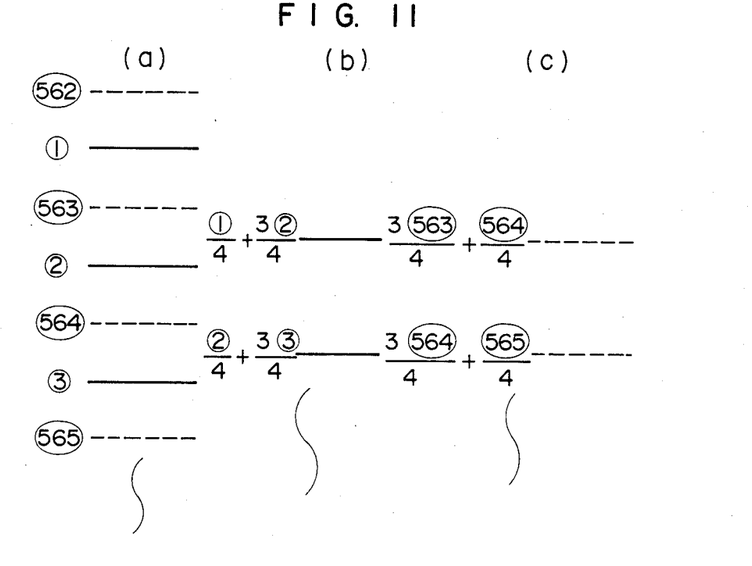
FIG. 11 shows a raster structure for illustrating signal processing of a second embodiment of the present invention.
Figure 12:
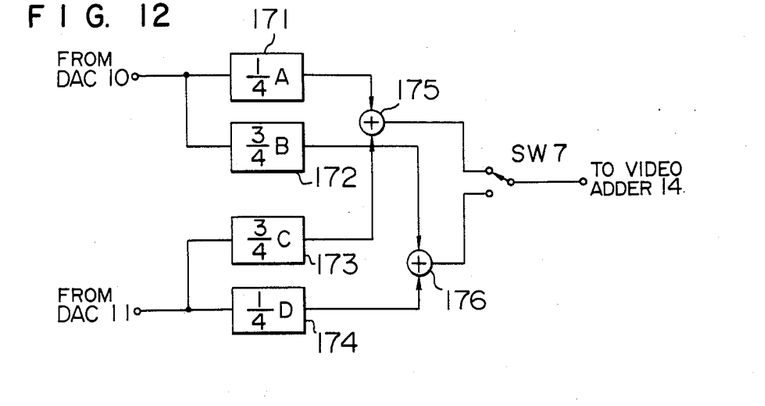
FIG. 12 shows a block diagram of a main portion of a second embodiment of the present invention.

A second embodiment of the present invention is explained with reference to FIGS. 11 and 12. As shown in FIG. 11, the second embodiment is characterized by that the position of the scan line after processing is at any position between scan lines. In FIG. 11, it is displaced by distance 3 from the upper one of the adjacent scan lines of the first field and by distance 1 from the lower one. The signal processing circuit excluding DAC 10, DAC 11 to SW7 is similar in configuration to that of FIG. 1.

As shown in FIG. 11(b), a new signal of the first field is a combined signal with inversely weighted distance by signal weights, and a new signal of the second field is also a combined signal with inversely weighted distances from the adjacent scan lines of the field. Those signals are selected by SW7 as shown in FIG. 12 at the field period to produce a new video signal. Assuming that the position of the first new video signal is between 563 and 2 in FIG. 11, and a distance from the scan line 1 is $l$ and a distance from the scan line 2 is m, weight A, B, C and D of weighters 171, 172, 173 and 174 of FIG. 12 are $m/(l+m)$, $l(l+m)$, $(l+m)/2(l+m)$ and $(l-m)/2(l+m)$, respectively. Assuming that the first new video signal is between 1 and 563 in FIG. 11, the above relation is met if it is spaced by $l$ from the scan line 562 and m from the scan line 563.

In the first and second embodiments, a full line of hivision signal is written into the line memory, and only a necessary portion thereof is read from the line memory. If the read timing can be properly controlled, the line memory may have only a memory capacitance necessary for readout.

Figure 13:
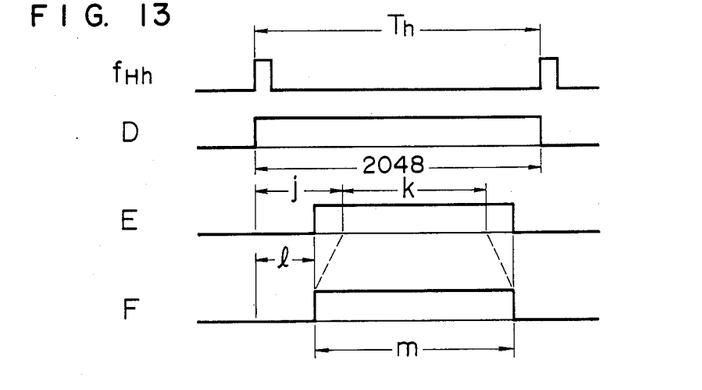
FIGS. 13 and 14 show embodiments of reduced line memory capacities.

Such reduction of memory capacity of the line memory is explained with reference to FIGS. 13 and 14. FIG. 13 shows a relation between memory allocation in one horizontal period of the hivision TV signal and an effective display period. A period m shown in FIG. 13 is an effective display period of the hivision TV signals ($m \cong 0.75\, T_h$). On the other hand, the conversion of the image aspect ratio from 5/3 to 4/3 means to expand a period k in the period m and accomodate it in the original period m (see FIGS. 13 line E and F). Thus, a minimum line memory capacity necessary for such processing is $k = m \cdot 4/5 \cong 0.75 T_h \cdot 4/5 \cong 0.6\, T_h$. Accordingly, the line memory need store only approximately 60% of 2048 words shown in FIG. 13. (See line D).

Figure 14:
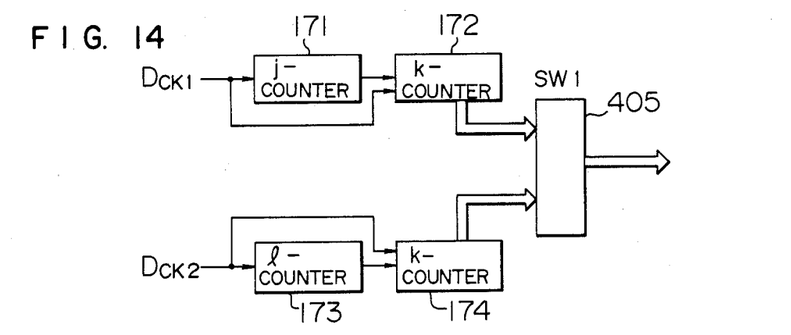

FIG. 14 shows a configuration therefor. As seen from the above, the effective memory capacity is of k words. A start timing of the effective image is determined by a j-counter 171 which counts j outputs of $D_{ck1}$. It is reset by the output of the j-counter 171, and then counts k outputs of $D_{ck1}$ by an output of a k-counter 172. Accordingly, data is written into the line memory from the start of the output of the j-counter 171 to the end of k counts by the k-counter 172.

On the other hand, the start timing of display is determined by an output of an $l$-counter 173 which counts $l$ outputs of $D_{ck2}$. It is reset by an output of the $l$-counter 173 and then counts k outputs of $D_{ck2}$ by a k-counter 174 to produce a read address. Since the counters 172 and 174 are k-counters, the same minimum information, that is, k words, are processed in the write mode and the read mode, although timings from the horizontal synchronization signal $f_{Hh}$ and the write and read periods are different.

The write addresses and the read addresses are switched by the multiplexors 405, 406 and 407 of FIG. 7 to produce address signals of the line memories 7-1, 7-2 and 7-3. (In FIG. 14, only SW1 405 is shown.) In this manner, the capacity of the line memory is reduced by approximately 40%.

In the first and second embodiments, the signal processing such as weighted addition of the scan line signals is effected with the DA-converted signals, although they may be processed in the form of digital signal and thereafter converted to analog signals.

In accodcance with the present invention, the one-half scan line position shift between the fields of the hivision signal is compensated by a small memory capacity, that is, three line memories per pixel bit so that non-interlaced scan is attained without loosing image quality. At the same time, the hivision signal image having an aspect ratio of ⅘ is attained so that it may be superimposed to the terminal signal with high quality.

I claim:

1. An image signal conversion method for converting an interlaced hivision TV image signal to a non-interlaced terminal image signal comprising the steps of:
    converting the interlaced hivision TV image signal to a digital data at a first sampling clock;

sequentially writing one scan line digital data to one of three line memories and reading from the other two line memories digital data previously written therein at a second sampling clock equal to 4/5 period to that of said first sampling clock;

in a first field, displaying an output of one of two sequentially read line memories, and in a second field, adding one-halves of the outputs of the two line memories by interpolation to produce a corresponding output at the display position of the first field for displaying at the same position as that of the first field.

2. An image signal conversion method according to claim 1 wherein the interpolation is effected after the outputs of the line memories have been converted to analog data.

3. An image signal conversion method according to claim 1 wherein the digital data outputs of the line memories are processed for interpolation and then it is converted to analog data.

4. An image signal conversion method according to claim 1 wherein only a portion of data to be read is written into the line memory.

5. An image signal conversion method for converting an interlaced hivision TV image signal to a non-interlaced terminal image signal comprising the steps of:

converting the interlaced hivision TV image signal to a digital data at a first sampling clock, sequentially writing one scan line digital data to one of three line memories and reading from the other two line memories digital data previously written therein at a second sampling clock equal to 4/5 period to that of said first sampling clock;

in a first field, forming a corresponding output at a display position by interpolating the outputs of the two sequentially read line memories, and in a second field, forming a corresponding output at the same display position as that of the first field by interpolating the outputs of the two sequentially read line memories.

6. An image signal conversion method according to claim 5 wherein the display position is at a 3/1 division position of one field of the hivision TV image signal.

7. An image signal conversion method according to claim 5 wherein the interpolation is effected after the outputs of the line memories have been converted to analog data.

8. An image signal conversion method according to claim 5 wherein the digital data outputs of the line memories are processed for interpolation and then it is converted to analog data.

9. An image signal conversion method according to claim 5 wherein only a portion of data to be read is written into the line memory.

10. An image conversion apparatus for converting an interlaced hivision TV image signal to a non-interlaced terminal image signal, comprising:

an AD converter for converting the TV image signal to digital data at a first sampling clock;

three line memories provided for each scan line of the digital data;

means for sequentially writing one line of output data of said AD converter to one of said three line-memories;

means for sequentially and parallelly reading data of two others of said three line memories at a second sampling clock equal to 4/5 period of that of the first sampling clock;

an interpolation circuit operable in a second field for forming a corresponding output at a display position in a first field by interpolation by adding one-halves of the outputs of the two line memories; and means for selecting one of the outputs of the two line memories in the first field and selecting the output of said interpolation circuit in the second field.

11. An image conversion apparatus according to claim 10 wherein a DA converter is provided preceding to said interpolation circuit.

12. An image conversion apparatus according to claim 10 wherein a DA converter is provided succeeding to said interpolation circuit.

13. An image conversion apparatus according to claim 10 wherein said line memories have only capacities required in the read mode.

14. An image conversion apparatus for converting an interlaced hivision TV image signal to a non-interlaced terminal image signal, comprising:

an AD converter for converting the TV image signal to digital data at a first sampling clock;

three line memories provided for each scan line of the digital data;

means for sequentially writing one line of output data of said AD converter to one of said three line memories;

means for sequentially and parallelly reading data of two others of said three line memories at a second sampling clock equal to 4/5 period of that of the first sampling clock;

a set of interpolation circuits operable in a first field for forming a corresponding output at a display position by interpolating the outputs of the two line memories;

another set of interpolation circuits operable in a second field for forming a corresponding output at the same display position as that of the first field by interpolating the outputs of the two line memories; and means for selecting the outputs of said one set of interpolation circuits in the first field and the output of said another set of interpolation circuits in the second field.

15. An image conversion apparatus according to claim 14 wherein the display position is a 3/1 division position of one field of the hivision TV image signal.

16. An image conversion apparatus according to claim 14 wherein a DA converter is provided preceding to said interpolation circuit.

17. An image conversion apparatus according to claim 14 wherein a DA converter is provided succeeding to said interpolation circuit.

18. An image conversion apparatus according to claim 14 wherein said line memories have only capacities required in the read mode.

* * * * *

UNITED STATES PATENT AND TRADEMARK OFFICE
CERTIFICATE OF CORRECTION

PATENT NO. : 4,814,873

DATED : March 21, 1989

INVENTOR(S) : Maekawa

It is certified that error appears in the above-identified patent and that said Letters Patent is hereby corrected as shown below:

```
Column 1, line 37 change "signals" to --signal--;
line 56 change "and" to --an--.
Column 2, line 62 change "sunchroniza-" to
--synchroniza- --.
Column 3, line 17 change "Signals" to --Signal--;
line 57 change "to an" to --to be an--.
Column 4, line 3 change "is" to --in--;
line 24 change "2048and" to --2048 and--.
Column 5, line 45 delete "such as terminal";
line 67 change "(1+m)/2(1+m)" to --(1+3m)/2(1+m)--.
Column 6, line 2 change "1from" to --1 from--;
line 18 change "accomodate" to --accommodate--;
line 54 change "signal" to --signals--;
line 55 change "accodcance" to --accordance--;
line 59 change "loosing" to --losing--;
line 61 change "3/4is" to --3/4 is--.
```

Signed and Sealed this

Tenth Day of July, 1990

Attest:

HARRY F. MANBECK, JR.

Attesting Officer

Commissioner of Patents and Trademarks